United States Patent
Yoshida et al.

(10) Patent No.: US 9,811,408 B2
(45) Date of Patent: **\*Nov. 7, 2017**

(54) INFORMATION TRANSMISSION SYSTEM

(71) Applicants: Shigetaka Yoshida, Komaki (JP); Atsushi Kojima, Kasugai (JP); Hideto Matsumoto, Nagoya (JP); Kiyotaka Ohara, Nagoya (JP)

(72) Inventors: Shigetaka Yoshida, Komaki (JP); Atsushi Kojima, Kasugai (JP); Hideto Matsumoto, Nagoya (JP); Kiyotaka Ohara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 622 days.

This patent is subject to a terminal disclaimer.

(21) Appl. No.: 14/074,225

(22) Filed: Nov. 7, 2013

(65) Prior Publication Data

US 2014/0068355 A1    Mar. 6, 2014

Related U.S. Application Data

(63) Continuation of application No. 13/407,590, filed on Feb. 28, 2012, now Pat. No. 8,626,858, which is a
(Continued)

(30) Foreign Application Priority Data

Aug. 13, 2001 (JP) ................... 2001-245320
Apr. 3, 2002 (JP) ................... 2002-100885

(51) Int. Cl.
    *G06F 15/16*    (2006.01)
    *G06F 11/07*    (2006.01)
    (Continued)

(52) U.S. Cl.
    CPC .......... *G06F 11/0784* (2013.01); *G06F 3/121* (2013.01); *G06F 3/1259* (2013.01);
    (Continued)

(58) Field of Classification Search
    CPC ..................................................... H04L 29/06
    (Continued)

(56) References Cited

U.S. PATENT DOCUMENTS 5,933,604 A    8/1999    Inakoshi
6,161,130 A   12/2000    Horvitz et al.
(Continued)

FOREIGN PATENT DOCUMENTS

EP    0843268 A2    5/1998
EP    0 996 061     4/2000
(Continued)

OTHER PUBLICATIONS

J. Reilly et al., "Enabling Mobile Network Managers," vol. 29, *Computer Networks and IDSN Systems*, pp. 1417-1428 (1997).

*Primary Examiner* — Khanh Dinh
(74) *Attorney, Agent, or Firm* — Oliff PLC

(57) ABSTRACT

A network device includes a processor; and a memory storing computer-readable instructions therein, the computer-readable instructions, when executed by the processor, causing the network device to perform: storing a first mail address and a second mail address; generating a first email to be addressed to the first mail address and a second email to be addressed to the second mail address, the first email having a first body including a URL, the second email having a second body including the URL; detecting a specific failure occurring in the network device; transmitting the first email to the first mail address and the second email to the second mail address when the specific failure is detected.

12 Claims, 13 Drawing Sheets

Related U.S. Application Data continuation of application No. 12/155,444, filed on Jun. 4, 2008, now Pat. No. 8,161,124, which is a continuation of application No. 10/216,387, filed on Aug. 12, 2002, now Pat. No. 7,398,306.

(51) Int. Cl.

| | | |
|---|---|---|
| *G06Q 10/10* | (2012.01) | |
| *H04L 12/24* | (2006.01) | |
| *H04L 12/26* | (2006.01) | |
| *H04L 12/58* | (2006.01) | |
| *H04L 29/08* | (2006.01) | |
| *G06F 3/12* | (2006.01) | |

(52) U.S. Cl.
CPC ......... *G06F 3/1285* (2013.01); *G06Q 10/107* (2013.01); *H04L 41/026* (2013.01); *H04L 41/22* (2013.01); *H04L 41/28* (2013.01); *H04L 43/0811* (2013.01); *H04L 51/14* (2013.01); *H04L 67/025* (2013.01); *H04L 67/125* (2013.01); *H04L 41/06* (2013.01); *H04L 51/30* (2013.01)

(58) Field of Classification Search
USPC ......................................... 709/220, 223, 226
See application file for complete search history.

(56) References Cited

U.S. PATENT DOCUMENTS

| | | | |
|---|---|---|---|
| 6,167,448 A | 12/2000 | Hemphill et al. | |
| 6,219,700 B1 | 4/2001 | Chang et al. | |
| 6,240,445 B1 | 5/2001 | Kumar et al. | |
| 6,327,677 B1 | 12/2001 | Garg et al. | |
| 6,449,739 B1 | 9/2002 | Landan | |
| 6,453,327 B1 | 9/2002 | Nielsen | |
| 6,493,366 B1 | 12/2002 | Johnson et al. | |
| 6,618,747 B1 | 9/2003 | Flynn et al. | |
| 6,621,823 B1 | 9/2003 | Mellquist et al. | |
| 6,633,782 B1 | 10/2003 | Schleiss et al. | |
| 6,675,356 B1 | 1/2004 | Adler et al. | |
| 6,700,575 B1 | 3/2004 | Bovarnick et al. | |
| 6,732,101 B1 | 5/2004 | Cook | |
| 6,738,933 B2 * | 5/2004 | Fraenkel ............ G06F 11/3006 702/186 |
| 6,747,754 B1 | 6/2004 | Iyoki | |
| 6,757,186 B2 | 6/2004 | Lin | |
| 6,760,752 B1 | 7/2004 | Liu et al. | |
| 6,901,519 B1 | 5/2005 | Stewart et al. | |
| 7,054,428 B1 | 5/2006 | Berthoud et al. | |
| 7,069,271 B1 | 6/2006 | Fadel et al. | |
| 7,315,826 B1 | 1/2008 | Guheen et al. | |
| 7,505,978 B2 * | 3/2009 | Bodin ............... G06F 17/30867 |
| 7,996,754 B2 * | 8/2011 | Bodin ............... G06F 17/30035 715/203 |
| 8,086,667 B1 * | 12/2011 | Randall ................ H04L 63/10 709/203 |
| 8,626,858 B2 * | 1/2014 | Yoshida ............... G06Q 10/107 705/50 |
| 8,661,333 B2 * | 2/2014 | Matsuda ........... G06F 17/30893 715/205 |
| 2001/0003827 A1 | 6/2001 | Shimamura | |
| 2002/0057449 A1 | 5/2002 | Chapman et al. | |
| 2002/0059384 A1 * | 5/2002 | Kaars ..................... H04L 51/08 709/206 |
| 2002/0085228 A1 * | 7/2002 | Yagita .................... G06F 3/1205 358/1.15 |
| 2002/0112095 A1 * | 8/2002 | Ford .................... H04L 12/2602 719/330 |
| 2002/0131070 A1 | 9/2002 | Housel et al. | |
| 2003/0051142 A1 | 3/2003 | Hidalgo et al. | |
| 2003/0065941 A1 | 4/2003 | Ballard et al. | |
| 2003/0120775 A1 | 6/2003 | York | |
| 2004/0205671 A1 | 10/2004 | Sukehiro et al. | |
| 2007/0128899 A1 * | 6/2007 | Mayer .................... G06F 9/4406 439/152 |
| 2007/0192683 A1 * | 8/2007 | Bodin ............... G06F 17/30905 715/234 |
| 2007/0214147 A1 * | 9/2007 | Bodin ................ G06F 17/3089 |
| 2007/0219794 A1 | 9/2007 | Park et al. | |
| 2007/0219863 A1 | 9/2007 | Park et al. | |
| 2008/0120129 A1 | 5/2008 | Seubert et al. | |
| 2008/0177994 A1 * | 7/2008 | Mayer .................... G06F 9/4418 713/2 |
| 2012/0079007 A1 * | 3/2012 | Brown ................... H04L 51/08 709/203 |
| 2012/0290545 A1 * | 11/2012 | Tumanov ............. G06F 11/3438 707/694 |

FOREIGN PATENT DOCUMENTS

| | | |
|---|---|---|
| EP | 1 014 622 A2 | 6/2000 |
| EP | 1 096 724 A1 | 5/2001 |
| EP | 1 278 334 A2 | 1/2003 |
| JP | A-6-028355 | 2/1994 |
| JP | A-11-345104 | 12/1999 |
| JP | A-2001-067349 | 3/2000 |
| JP | A-2000-122894 | 4/2000 |
| JP | 1 063 598 | 12/2000 |
| JP | A-2001-034565 | 2/2001 |
| JP | A-2001-117629 | 4/2001 |
| JP | A-2001-188726 | 7/2001 |

* cited by examiner

FIG.5(a)

```
40 ┌ To: admin1@brother.co.jp
   │ From: brn31C101@example.com
   │ Date: Web, 19 May 1999 15:24:46 +0900                    30
   └ Subject: Status Notification [PAPER SIZE ERROR    ]
```

```
 6 ┌ <Status Notification>
   └ The device status is [PAPER SIZE ERROR    ]

┌ <Node Information>
   │ Name: BRN_31C101
   │ Device Type: PRINTER A series
 7 │ Location: 5 F SOUTH
   │ Contact: XXXX@brother.co.jp
   │ IP Address: 10.134.43.15
   └ JOB: "UNTITLED.txt"                8

URL: http://10.134.43.15/control/loadpapre/ld0214567790

┌ <Other Information>
   │ Admin2: JOB ERROR
41 │ Page Count: 3680(pages)
   └ Drum Count: 3680
```

FIG.5(b)

```
40 ┌ To: admin1@brother.co.jp
   │ From: brn31C101@example.com
   │ Date: Web, 19 May 1999 15:24:46 +0900                    31
   └ Subject: Status Notification [PAPER SIZE ERROR    ]
```

```
 9 ┌ <Status Notification>
   └ The device status is [PAPER SIZE ERROR    ]

┌ <Node Information>
   │ Name: BRN_31C101
   │ Device Type: PRINTER A series
10 │ Location: 5 F SOUTH
   │ Contact: XXXX@brother.co.jp
   │ IP Address: 10.134.43.15
   └ JOB: "UNTITLED.txt"

┌ <Other Information>
   │ Admin2: JOB ERROR
41 │ Page Count: 3680(pages)
   └ Drum Count: 3680
```

FIG.10

To: admin1@brother.co.jp
From: brn31C101@example.com
Date: Web, 19 May 1999 15:24:46 +0900
Subject: Status Notification [PAPER SIZE ERROR    ]

50

<Status Notification>
The device status is [PAPER SIZE ERROR    ]

<Node Information>
Name: BRN_31C101
Device Type: PRINTER A series
Location: 5 F SOUTH
Contact: XXXX@brother.co.jp
IP Address: 10.134.43.15
JOB: "UNTITLED.txt"

<Other Information>
Admin2: JOB ERROR
Page Count: 3680(pages)
Drum Count: 3680

THE JOB "UNTITLED.txt" WAS STOPPED BECAUSE THE SHEET SIZE IN THE PRINTER DOES NOT MATCH THE SHEET SIZE OF THE DOCUMENT.
THE DOCUMENT IS SET TO BE PRINTER ON: "LETTER" SIZE SHEETS.
HOWEVER, THE PRINTER IS PRESENTLY LOADED WITH: "A4" SIZE SHEETS.

○ CANCEL PRINTING JOB

⦿ PRINT OUT JOB USING PRESENTLY AVAILABLE SHEET SIZE

○ I WILL LOAD THE PROPER SIZED SHEET INTO THE PRINTER

| TRANSMIT |

FIG.12

62 { To: admin1@brother.co.jp
From: brn31ae84@example.com
Date: Web, 19 May 1999 15:24:46 +0900
Subject: E-mail report 63 { Date: 2001/12/25
Time: 15:11

64 { <Node Information>
Name: BRN_31D6EA
Device Type: PRINTER A series
Location: 5 F SOUTH
Contact: XXXX@brother.co.jp
IP Address: 10.134.43.15

URL: http://10.134.43.7/printer/main.html

65 { <Device Status>
Page Count: 3680
Drum Count: 3680
Coverage: 24%
Print Pages
  A4/LETTER: 3650
  LEGAL PAGE: 0
  B5/EXE PAGE: 0
Remain Life
  DRUM UNIT: 16320
Jam Count: 201

66 { <Toner Information>
Estimated Pages Remaining: 240303

Configure E-mail reports (1) Administrator Address    admin1.user@brother.co.jp

Please Select Frequency    ● Daily
                                   ○ Weekly
                                   THE DAY OF THE WEEK    Monday ▼
                                   ○ Monthly
                                   DATE                           1

TIME                       0 : 00

[ Help ]

[Cancel] [Submit]

FIG.15

```
      ⎧ <Status Information>
   24 ⎨
      ⎩ The printer panel status is [COVER OPEN    ]

⎧ <Node Information>
      ⎪
      ⎪ Name: BRN_31AE84
   25 ⎨
      ⎪ Printer Type: Printer X
      ⎪
      ⎩ Location: 5F
```

INFORMATION TRANSMISSION SYSTEM

This is a continuation of U.S. patent application Ser. No. 13/407,590 filed Feb. 28, 2012, which is a continuation of U.S. patent application Ser. No. 12/155,444 filed Jun. 4, 2008, now U.S. Pat. No. 8,161,124, which is a continuation of U.S. patent application Ser. No. 10/216,387 filed on Aug. 12, 2002, now U.S. Pat. No. 7,398,306, which claims the benefit of Japanese Patent Application No. 2001-245320 filed Aug. 13, 2001 and Japanese Patent Application No. 2002-100885 filed Apr. 3, 2002. The disclosures of the prior applications are hereby incorporated by reference herein in their entirety.

BACKGROUND OF THE INVENTION

1. Field of the Invention

The present invention relates to a network terminal capable of notifying an administrator terminal about information on network terminals, such as printers connected to a network, by email.

2. Description of the Related Art

Printers can be connected to a network and shared by several people on a network. Some network printers are able to notify the network administrator about problems such as a sheet size error or when the printer runs out of toner by sending information about the problem to the administrator in an email message.

FIG. 15 is a schematic view representing an example of problem information to be sent to a network administrator by email. As shown in FIG. 15, conventional problem information includes status information 24 and node information 25. The status information 24 indicates a summary of the printer condition. The node information 25 indicates the name, type, and location of the printer. The email message that notified the network administrator of the problem information will be referred to as the "notifying message", hereinafter. The notifying message is automatically sent to the email address of the network administrator when a problem is generated at the printer. When the network administrator receives the notifying message, then he or she goes over to the printer indicated in the notifying message and solves the problem while referring to the notifying message.

However, if the network administrator must go to the printer in order to solve problems, then it is very difficult for the network administrator to solve printer problems rapidly when the network extends over a large area and the problem printer is not at a location near the network administrator.

Some networks include a printer server provided with a printer management tool that is capable of monitoring and manipulating the printer. The network administrator inputs a commanded to the printer management tool from the printer server, or from a terminal that has accessed to the printer server, to manipulate the printer and overcome problems in the printer. However, the network administrator must remember all the appropriate commands for manipulating the printer using the printer management tool. This makes the printer management tool troublesome and complex to use.

Some printers are provided with a management page of a web-page format that can be accessed by specifying the address of the management web page. In this case, the network administrator accesses the web server in the printer from a terminal connected to the network and solves problems with the printer through the management web page. However, if the network administrator does not know or forgets the address of the management web page, then it will take time for the network administrator to access the management web page, resulting in a delay in solving the printer problem.

SUMMARY OF THE INVENTION

It is an object of the present invention to overcome the above-described problems and provide a terminal information notification system, a terminal information notification method, and a network terminal that facilitates confirmation of internal information or the cause of problems when problems occur or when internal information is to be confirmed or changed.

To achieve the above and other objects, the present invention provides a network device comprising: a processor; and a memory storing computer-readable instructions therein, the computer-readable instructions, when executed by the processor, causing the network device to perform: storing a first mail address and a second mail address; generating a first email to be addressed to the first mail address and a second email to be addressed to the second mail address, the first email having a first body including a URL, the second email having a second body including the URL; detecting a specific failure occurring in the network device; and transmitting the first email to the first mail address and the second email to the second mail address when the specific failure is detected.

The present invention provides a non-transitory computer-readable medium storing computer-readable instructions for a network device, when executed by a processor of the network device, causing the network device to perform: storing a first mail address and a second mail address; generating a first email to be addressed to the first mail address and a second email to be addressed to the second mail address, the first email having a first body including a URL, the second email having a second body including the URL; detecting a specific failure occurring in the network device; and transmitting the first email to the first mail address and the second email to the second mail address when the specific failure is detected.

BRIEF DESCRIPTION OF THE DRAWINGS

The above and other objects, features and advantages of the invention will become more apparent from reading the following description of the embodiment taken in connection with the accompanying drawings in which:

FIG. 5(*a*) is a schematic view showing a screen displaying an email message prepared by the printer and addressed to an administrator when it is set that an URL should be appended to the email message;

FIG. 5(*b*) is a schematic view showing a screen displaying an email message prepared by the printer and addressed to an administrator when it is set that an URL should not be appended to the email message;

FIG. 10 is a schematic view showing a screen displaying a modification of the email message shown in FIG. 5(a);

FIG. 12 is a schematic view showing an email message addressed to the administrator transmitted as a status report to the administrator;

FIG. 15 is a schematic view showing a conventional email message addressed to the administrator transmitted as a status report to the administrator.

DETAILED DESCRIPTION OF THE PREFERRED EMBODIMENTS

Next, a first embodiment of the present invention will be described while referring to the attached drawings.

Figure 1:
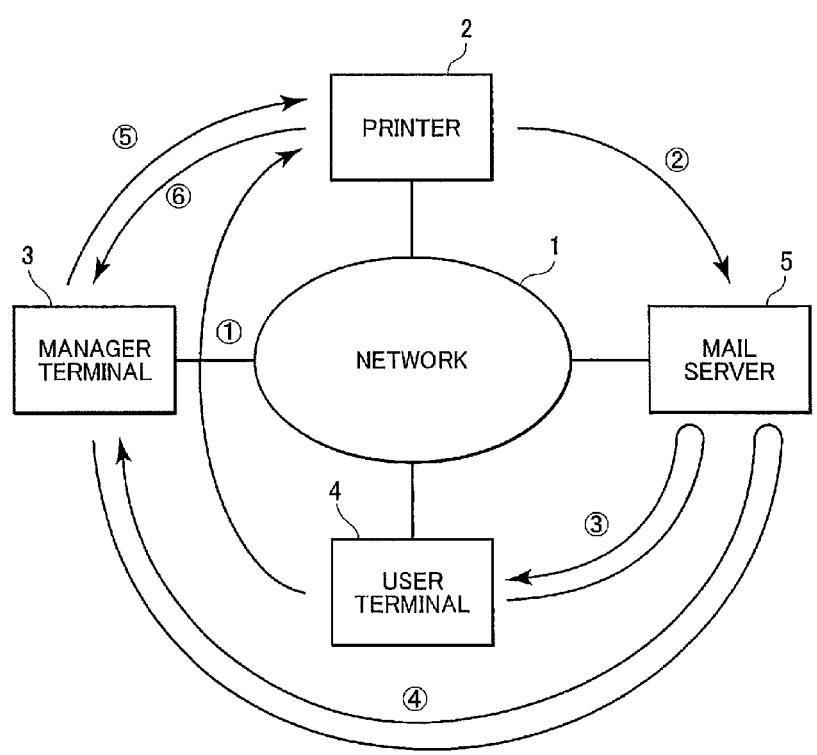
FIG. 1 is a schematic view showing a network system according to an embodiment of the present invention.

FIG. 1 is a schematic view showing a network system according to the present embodiment. As shown in FIG. 1, a printer 2, an administrator terminal 3, a user terminal 4, and a mail server 5 are connected to a network 1. The printer 2 serves as a network terminal of the present invention. The administrator terminal 3 is for performing network management operations such as settings and adjustments to the printer 2. The user terminal 4 uses the printer 2. The mail server 5 performs management operations such as exchange of email messages with the terminals across the network 1.

The administrator terminal 3 and the user terminal 4 are well-known personal computers installed with email and browser software to enable transmission and reception of email messages and viewing web pages via the network. The administrator terminal 3 and the user terminal 4 are also installed with a printer control software, commonly referred to as a printer driver, for using the printer 2. The mail server 5 is a well-known personal computer installed with a SMTP server program for managing transmission of email messages and a POP3 server program for managing reception of email messages.

To facilitate explanation, the embodiment will describe only one each of the printer 2, the administrator terminal 3, and the user terminal 4 connected to the network 1. However, it should be noted that more than one of each can be connected to the network 1.

Figure 2:
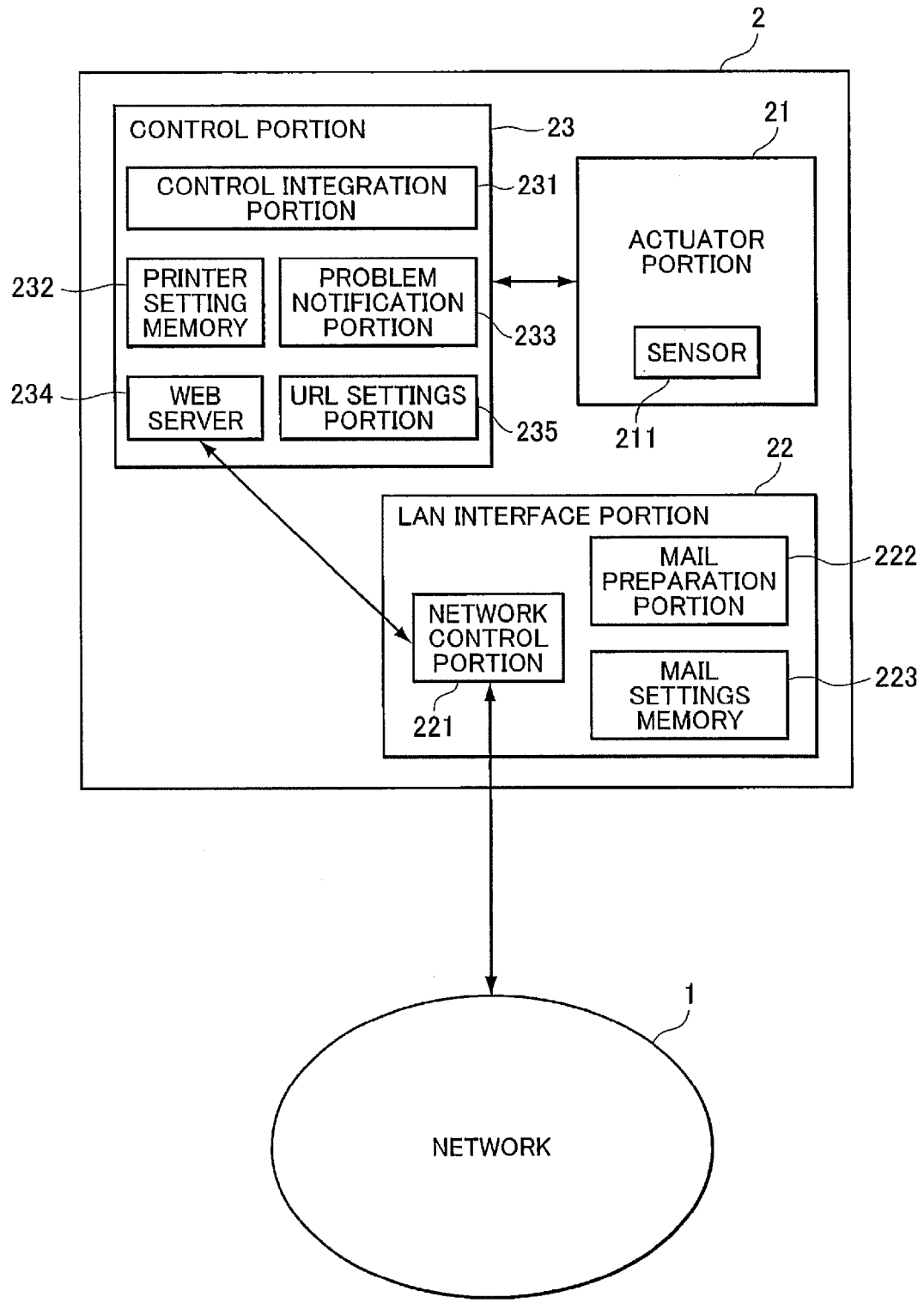
FIG. 2 is a block diagram showing functional groups in a printer of the network system of FIG. 1.

FIG. 2 is a block diagram showing functional groups in the printer 2. As shown in FIG. 2, the printer 2 includes an actuator portion 21, a local area network (LAN) interface portion 22, and a control portion 23. The actuator portion 21 is for performing operations of sheet feed, printing, and the like. The LAN interface portion 22 is for managing exchanges between the printer 2 and the network 1. The control portion 23 is for controlling various components of the printer 2.

The actuator portion 21 includes mechanisms such as a printing mechanism and a sheet feed mechanism. A sensor 211 is provided for each mechanism in order to detect problems in the corresponding mechanism. Output from the sensor 211 is input into the control portion 23. Examples of sensor 211 include a cover open/closure sensor, a paper feed sensor (a paper jam sensor), a temperature sensor to be located in a thermally fixing section, a paper empty sensor, a software error sensor for sensing, for example, shortage of memory capacity, a paper size sensor for sensing the size of the paper and signaling when improper sized paper is loaded, and sensors for sensing an unloaded condition of ink cartridge or toner cartridge.

The LAN interface portion 22 includes a network control portion 221, a mail preparation portion 222, and a mail settings memory 223. The network control portion 221 controls transmissions exchanged between the network 1 and the printer 2. The mail preparation portion 222 is responsible for preparing notification mail and appending the URL of a control page to the notification mail. The mail settings memory 223 stores settings such as the address of the transmission target of a notification mail and whether it is necessary to append a URL to the notification mail, or period at which the condition of the printer 2 is periodically notified to the network administrator.

The control portion 23 includes a control integration portion 231, a printer settings memory 232, a problem detection portion 233, a web server 234, and a URL settings portion 235. The control integration portion 231 processes commands and data that was transmitted over the network 1 from the administrator terminal 3 and the user terminal 4 and integrates operations of the actuator portion 21 and other components in the control portion 23 based on the commands and data. The printer settings memory 232 stores settings set for the printer 2. The problem detection portion 233 constantly monitors output from the sensor 211 of the actuator portion 21 to detect problem detection signals output from the sensor 211 when a problem occurs in the actuator portion 21. The web server 234 provides a setting screen, a controller page, and other pages in accordance request from terminals on the network 1. The setting screen is for setting various settings of the printer 2. The web server 234 generates the controller page, which is for performing operations to control the printer 2. The URL settings portion 235 is for setting URL of the controller page each time the web server 234 generates the controller page.

The control portion 23 and the LAN interface portion 22 are formed by well-known circuitry such as a central processing unit (CPU), random access memory (RAM), read only memory (ROM), an I/O, and a serial interface. The functional blocks within the control portion 23 and the LAN interface portion 22 are realized by execution of programs.

When a problem such as a sheet size error occurs in the printer 2, the printer 2 transmits a notification mail to the email address registered in the mail settings memory 223. The notification mail specifies the location and type of the problem.

The printer 2 transmits the notification mail to the email address at the notification timing, which is the period preregistered in the mail settings memory 223, so that the user can know the condition in the printer 2. The notification timing could be set for a period of timing such as every six hours. Alternatively, the notification timing could be set to every day, week, or month for example, wherein the time of day of the notification timing is also set. As a further alternative, the notification timing could be set for a single time on a specific day at a specific time.

Figure 3:
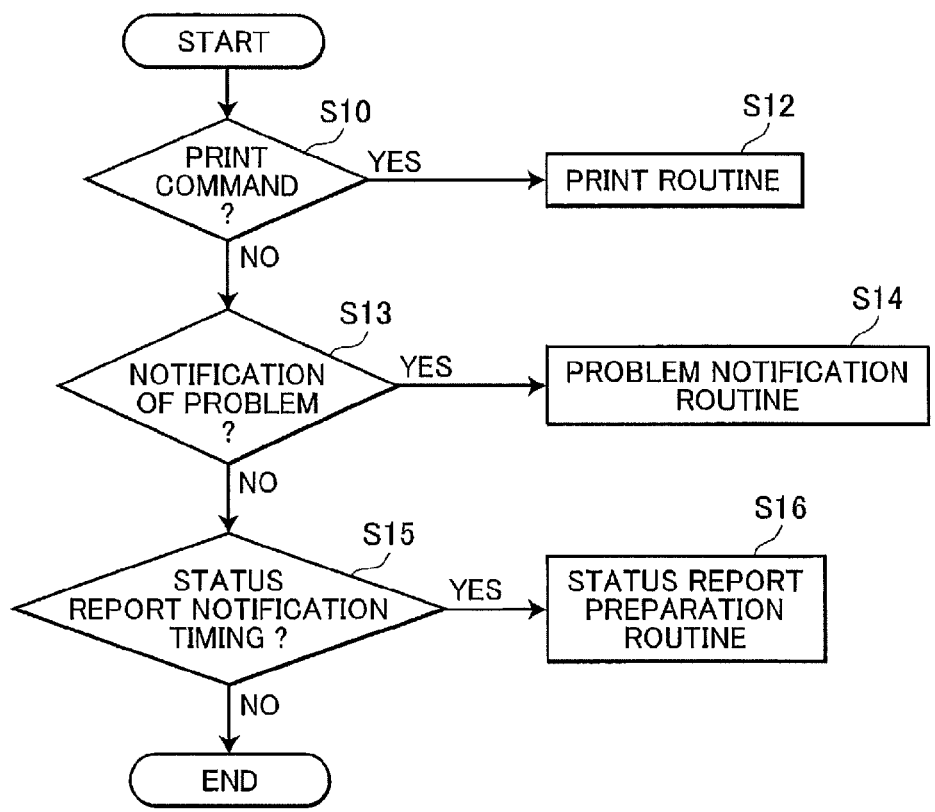
FIG. 3 is a flowchart representing a main routine performed by a control portion of the printer in FIG. 2.

FIG. 3 is a flowchart representing a main routine performed by the control portion 23 of the printer 2.

During the main routine of the printer 2, first whether or not a print command has come over the network 1 from the user terminal 4 is monitored in S10. When it is judged that a print command has arrived (S10: YES), then a print routine is performed in S12. During the print routine, the actuator portion 21 is controlled in the normal manner based on received data. On the other hand, if no print command is received (S10: NO), then whether or not a problem has been notified by the problem detection portion 233 is judged in S13. If so (S13: YES), then a problem notification routine is performed in S14.

Further, if no problem is detected (S13: NO), then it is judged in S15 whether or not the notification timing that is registered in the mail settings memory 223 has been reached. If so (S15: YES), then a status report preparation routine is performed in S16. The status report preparation routine is for transmitting a notification mail that indicates the condition in the printer 2.

Whether or not the notification timing has been reached is judged in S15 based on whether or not a status report notification has been set and on whether or not the set time has arrived or elapsed. Since the printer 2 is not constantly ON, the notification timing may arrive while the power of the printer 2 is turned OFF. Therefore, whether or not the set time has elapsed is confirmed in association with when the power is turned ON. If it is judged that the set time has elapsed, then a status report is sent to the administrator immediately.

The main routine is repeatedly executed at a predetermined timing. The predetermined timing is every millisecond in the present embodiment.

Figure 4:
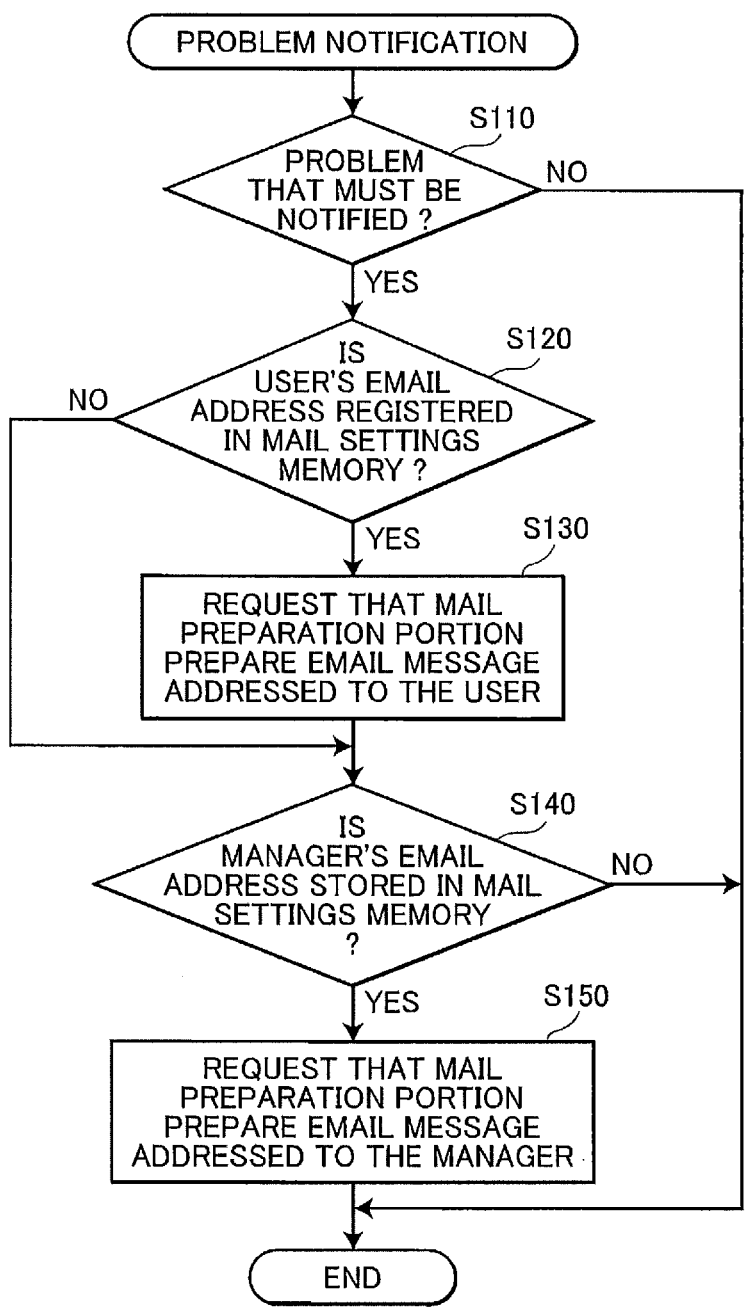
FIG. 4 is a flowchart representing a problem detection routine of the main routine shown in FIG. 3.

FIG. 4 is a flowchart representing the problem detection routine executed in S14 of the main routine shown in FIG. 3. The control integration portion 231 executes processes in the order indicated in the flowchart when a problem occurs.

As shown in FIG. 4, when a problem occurs in the printer 2 and the problem detection portion 233 detects input of a problem detection signal from the sensor 211 of the actuator portion 21, then in S110 the control integration portion 231 determines which sensor 211 generated the problem detection signal, determines the location and content of the problem, and judges whether it is a problem that needs to be notified to the administrator.

When it is judged that the problem needs to be notified to the administrator (S110: YES), then in S120 it is confirmed whether or not the email address of the user of the user terminal 4 is stored in the mail settings memory 223. When it is determined that the email address of the user is registered (S120: YES), then in S130 the control integration portion 231 requests that the mail preparation portion 222 prepares a notification mail for the user. This notification mail will be referred to as an "email message addressed to the user" hereinafter. Next, it is confirmed in S140 whether or not the email address of the administrator that uses the administrator terminal 3 is registered in the mail settings memory 223. It should be noted that if it is determined that the email address of the user is not registered in the mail settings memory 223 (S120: NO), then it is confirmed in S140 whether or not the email address of the administrator is registered in the mail settings memory 223 without requesting preparation of an email message addressed to the user.

When it is confirmed that the email address of the administrator is registered in the mail settings memory 223 (S140: YES), then in S150 the mail preparation portion 222 is requested to prepare a notification mail for the administrator. The notification mail for the administrator will be referred to as a "message addressed to the administrator" hereinafter. At this time, if addresses for more than one administrator are registered, then the mail preparation portion 222 is requested to prepare a separate message for each administrator.

According to the present embodiment, the user's email address and the like is registered using the printer driver installed in the user terminal 4. However, in contrast, the administrator's email address is registered using a manger registration screen provided to the administrator terminal 3 by the web server 234. The embodiment could be modified so that the user's email address is registered using the web server 234 and the administrator's email address is registered using the printer driver. Registration need not be performed using a printer driver, but could alternatively be performed using a printer administrator application software installed in the administrator terminal 3 or the user terminal 4.

Figure 6:
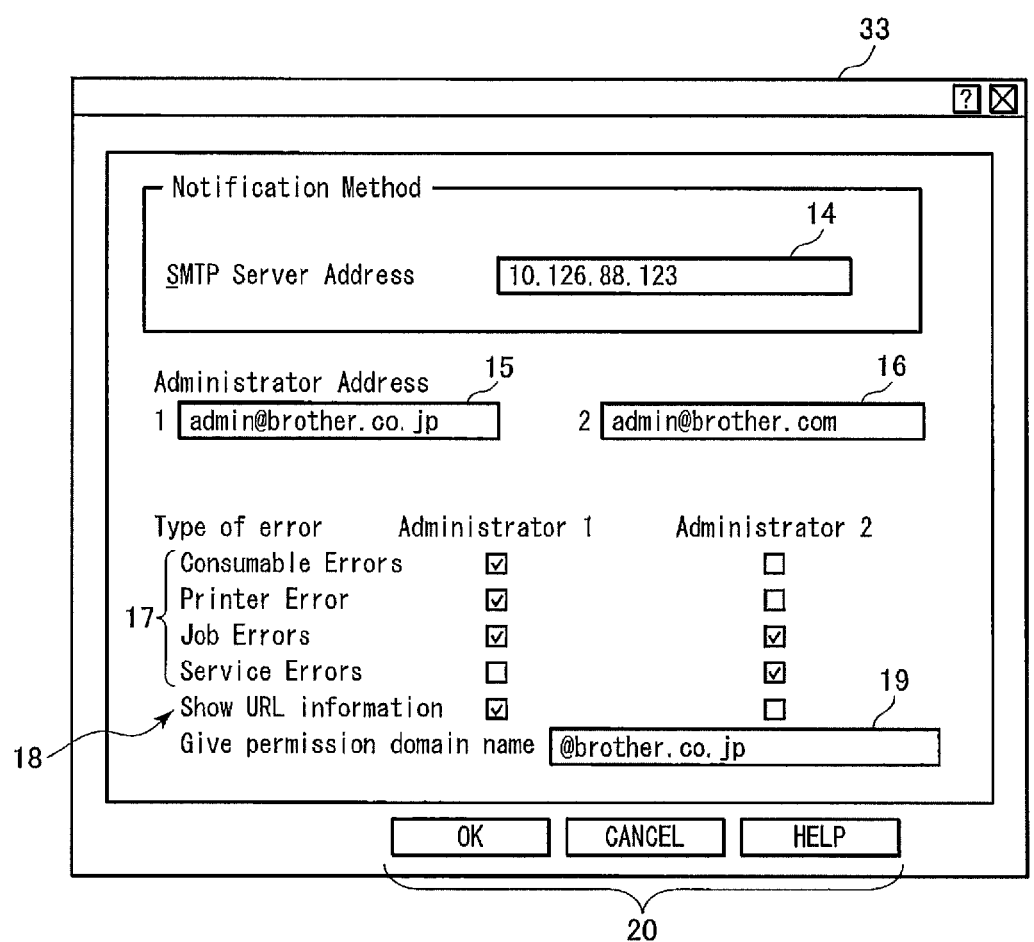
FIG. 6 is a schematic view showing an administrator registration screen for registering the email address and the like of the administrator in the 223.

FIG. 6 is a schematic view showing an administrator registration screen for registering the email address and the like of the administrator in the 223.

As shown in FIG. 6, the administrator registration screen 33 includes a server address registration space 14, administrator address registration spaces 15, 16, an administrator selection section 17, a URL requirement setting category 18, an permission domain registration space 19, and a setting confirmation section 20. The server address registration space 14 is where the INK PARTICLES address of the mail server 5 is registered. The administrator address registration spaces 15, 16 are where the email address of a plurality of administrators are registered. The administrator selection section 17 is for determining which administrator is to be notified for which problems. The URL requirement setting category 18 is for setting whether the URL of the controller page is to appended to email messages addressed to the administrator. The permission domain registration space 19 sets the controller page that can only be accessed by an administrator with a particular domain name. The setting confirmation section 20 is for designating whether the settings should definitely applied to email messages addressed to the administrator.

The administrator registration screen 33 is supported by a graphic user interface that enables settings for the server address registration space 14, the administrator address registration spaces 15, 16, and the permission domain registration space 19 to be designated by merely inputting the IP address, an email addresses, and a domain name, respectively. A selection or requirement can be set in the administrator selection section 17 and the URL requirement setting category 18 by merely clicking on square frames at the immediate left of each category and then using the setting confirmation section 20 to confirm the settings.

When the administrator's email address and the like are registered or set in the administrator registration screen 33 and the settings are confirmed using the setting confirmation section 20, then the settings in each category are sent to the control integration portion 231 over the network control portion 221. After the control integration portion 231 processes the settings, then the control integration portion 231 stores the settings in the mail settings memory 223.

It should be noted that the administrator registration screen 33 is stored in the memory as a piece of settings information of the administrator terminal 3. The administrator registration screen 33 is retrieved from the memory for updating the settings. After settings are updated, then the settings information is sent over the network 1 to the printer 2 and stored in the mail settings memory 223 of the printer 2.

Although not shown in the drawings, several registration screens similar to the one shown in FIG. 6 are prepared for registering a variety of setting information. The email address of the printer 2 can be registered using such a registration screen. The registered email address is inserted into the "From:" space of the header information 40 shown in FIGS. 5(*a*) and 5(*b*) so that the administrator that receives the message addressed to the administrator will know where the message came from.

Figure 7:
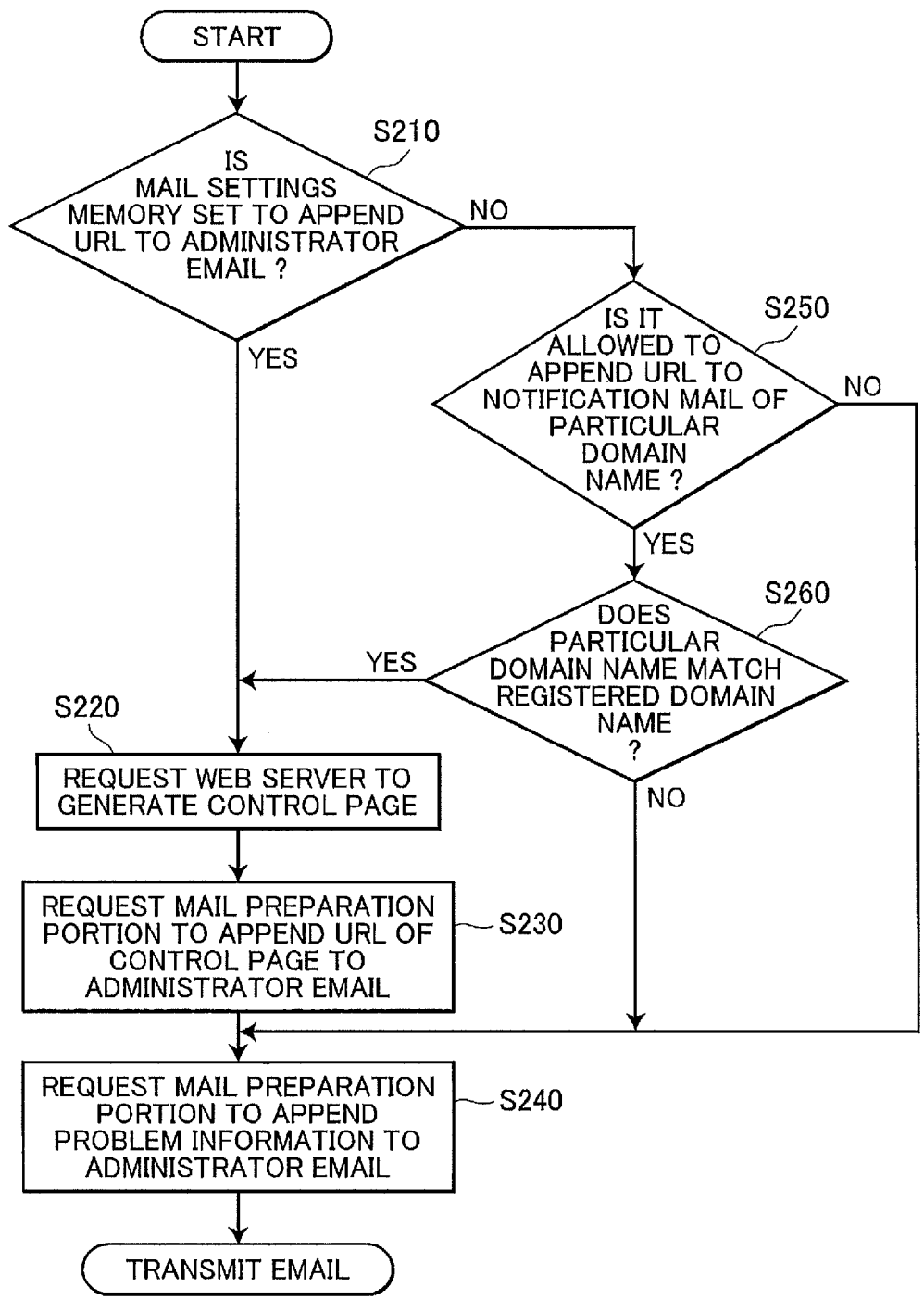
FIG. 7 is a flowchart representing flow of processes performed in the control integration portion 231 when a message addressed to an administrator is prepared.

FIG. 7 is a flowchart representing flow of processes performed in the control integration portion 231 when a message addressed to an administrator is prepared.

As shown in FIG. 7, when the mail preparation portion 222 prepares an email message addressed to an administrator, the control integration portion 231 first confirms in S210 whether the mail settings memory 223 is set to append the URL to an email message addressed to an administrator. If it is set that the URL is to be appended (S210: YES), then in S220 a request is made to the web server 234 to generate a control page.

Next, in S230 a request is made to the mail preparation portion 222 to append, to the email message addressed to the administrator, the URL of the control page determined by the URL settings portion 235. In S240, it is requested that problem information be appended to the email message addressed to the administrator. The problem information includes location and content of the problem. As a result of the above steps, an email message that is addressed to an administrator is prepared and sent to the email address of the administrator.

When the control integration portion 231 confirms that settings of the mail settings memory 223 indicate that the URL is not to be displayed (S210: NO), then in S250 it is confirmed whether it is allowed to append the URL to only the notification mail with the particular domain name. If so (S250: YES), then in S260 it is confirmed whether the particular domain name matches the registered domain name. If so (S260: YES), then in S220 the control integration portion 231 requests the web server 234 to generate a control page.

If it is confirmed that it is not allowed to append the URL to notification mail with the particular domain name (S250: NO) or it is confirmed the particular domain name does not match the registered domain name (S260: NO), then the mail preparation portion 222 is requested to append problem information to the email message addressed to the administrator, without requesting the web server 234 to generate a control page or requesting that the URL of the control page be appended to the email message addressed to the administrator.

The processes of S250 and S260 can be modified, or new processes can be added, so that when the domain name in the email address of the printer 2 matches the notified domain name, then a request is made to the web server 234 to generate a control page and a request is made to the mail preparation portion 222 to append the URL of the control page determined by the URL settings portion 235 to the email message that is addressed to the administrator.

FIG. 5(*a*) shows a screen displaying an email message addressed and send to an administrator when a problem occurs. As shown in FIG. 5(*a*), the email message 30 addressed an administrator includes header information 40, a status notification 6, node information 7, the URL display portion 8, and other information 41. The status notification 6 indicates the condition of the printer 2. The node information 7 includes information such as the name, device type, and location of the printer 2. The URL display portion 8 is a hypertext link to the URL of the control page. The other information 41 includes a page count and information indicating to the other administrator selected using the administrator selection section 17 of the administrator registration screen 33 shown in FIG. 6 that a problem occurred. In this case, the other administrator is administrator 2.

Because the email message 30 addressed an administrator is configured in this manner, the administrator will be able to quickly grasp the condition of the printer 2 and details of problem generated at the printer 2. Also, the administrator can access the control page by merely clicking on the URL display portion 8.

When it is set that an URL should not be appended to the email message, but the domain name of the administrator does not match the permission domain, then as shown in FIG. 5(*b*), an email message 31 addressed an administrator is sent to the administrator along with the header information 40. The email message 31 addressed an administrator includes only status notification 9, node information 10, and other information 41, but has no URL for the control page appended thereto.

Figure 8:
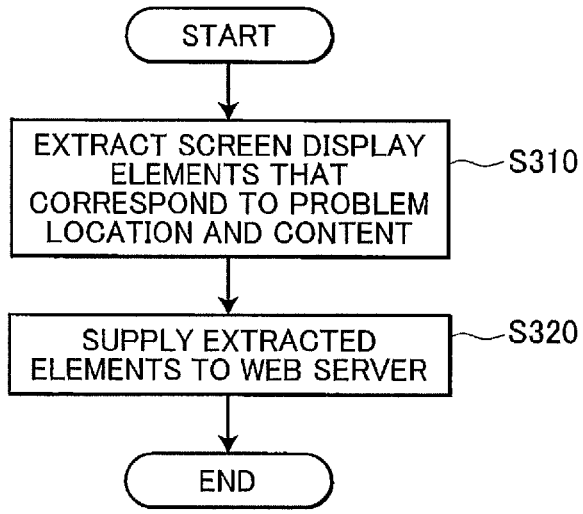
FIG. 8 is a flowchart representing flow of processes performed in the control integration portion when the printer generates a control page.

FIG. 8 is a flowchart representing flow of processes performed in the control integration portion 231 when the printer 2 generates a control page. As shown in FIG. 8, when the control page generation routine is started, then in S310 the control integration portion 231 extracts elements used in the control page that corresponds to the problem content. Then the control integration portion 231 supplies the elements to the web server 234 in S320. The web server 234 combines the extracted elements to generate a control page.

Figure 9:
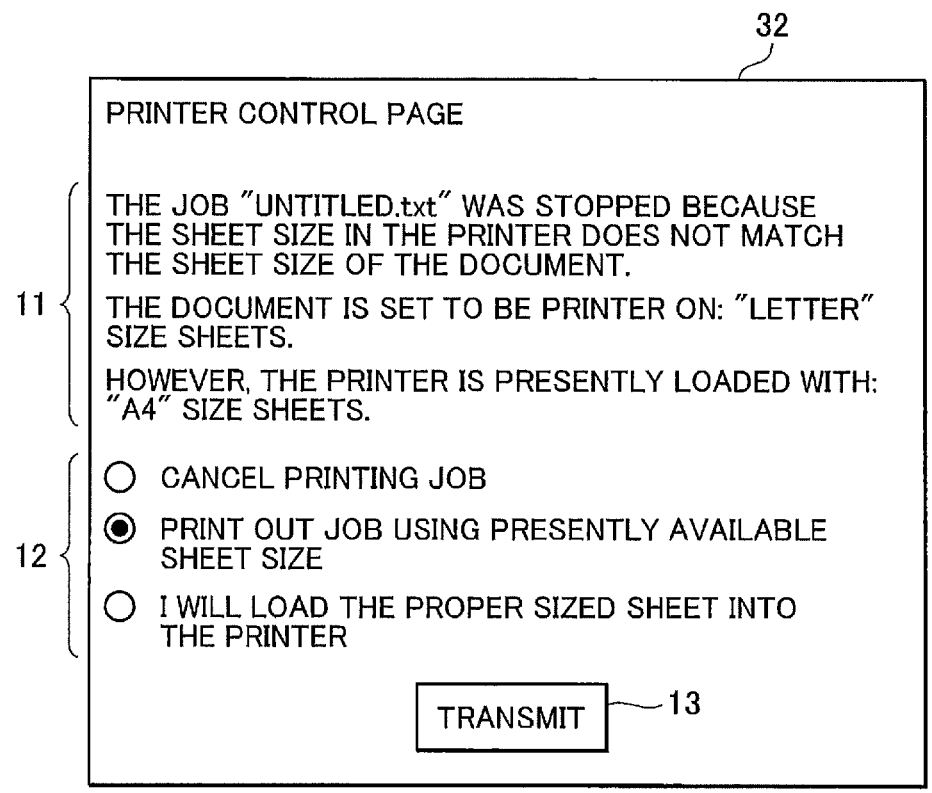
FIG. 9 is a schematic view showing a displayed screen of the control page generated by the web server.

FIG. 9 is a schematic view showing a displayed screen of a control page 32 generated by the web server 234. As shown in FIG. 9, the control page 32 includes an error display portion 11, an operation content selection portion 12, and a transmit button 13. The error display portion 11 indicates content of the problem that occurred in the printer 2. The operation content selection portion 12 is for selecting the category of operation to be performed at the printer 2. The transmit button 13 is for transmitting content of the selected operation to the printer 2.

The control page 32 is supported by a graphic user interface in the same manner as the administrator registration screen 33 and displays circular frames to the left of the operation categories of the operation content selection portion 12. The administrator selects desired operation categories by clicking in the circular frames to the left of the operation categories. As a result, a black dot is displayed in the center of the clicked circular frame to indicate that the operation category was selected. The administrator can transmit the operation content to the printer 2 by merely clicking on the transmit button 13.

The operation content selected by the administrator is transmitted to the control integration portion 231 over the network 1 and the network control portion 221. After processing the operation content, the control integration portion 231 controls to overcome the problem and stores new settings relating to the printer 2 in the printer settings memory 232.

Next, an explanation will be provided for operations of the network 1 including the printer 2 with the above-described configuration with reference to FIG. 1. When the user commands the user terminal 4 to execute a printing operation, then (1) the user terminal 4 transmits a print execution command to the printer 2. The printer 2 starts printing operations when it receives the print execution command. If some sort of problem occurs at this time that prevents the printer 2 from printing, then the printer 2 generates a notification mail and a control page and (2) transmits the notification mail to the mail server 5.

The printer 2 is preset with the email addresses of the administrator that uses the administrator terminal 3 and the user that uses the user terminal 4 as transmission targets. Also, the administrator terminal 3 and the user terminal 4 are set to periodically access the mail server 5. For this reason, when the printer 2 transmits email messages addressed to the administrator and the user, then (3) the administrator terminal 3 and (4) the user terminal 4 receive notification mail from the mail server 5.

The email message addressed to the administrator is appended with the URL link to the control page. When the administrator clicks on the URL link and (5) accesses the control page, then (6) the printer 2 provides the control page to the administrator terminal 3.

This configuration enables the administrator to quickly take care of problems when a problem occurs in the printer 2. A network terminal can be realized that facilitates operations for overcoming problems.

The embodiment describes the email message 30 addressed to the administrator shown in FIG. 5(*a*) with an appended link that the administrator clicks to display the control page 32 shown in FIG. 9. However, email message 50 addressed to the administrator shown in FIG. 10 is appended with alternative methods for overcoming problems in the printer 2. In this case, the administrator needs to merely select one of the appended methods to overcome the problem at the printer 2. The selected method is then newly set in the printer 2 and stored in the printer settings memory 232. In the same manner as the control page 32, when the administrator selects an operation category by clicking on the circular frame to the left of the operation category, then a black dot will be displayed in the center of the circular frame to indicate that the operation category was selected. The administrator merely needs to click on the transmit button 13 to transit the content of the desired operation to the printer 2. As an alternative, a different URL can be listed for each method for handling a problem so that the user can transmit content of the desired operation to the printer 2 by merely clicking on the corresponding URL. In this case, in S230 of FIG. 7 the mail preparation portion 222 appends URLs to the different control functions of the printer 2 to the email message addressed to the administrator and S220 of FIG. 7 can be dispensed with.

Figure 11:
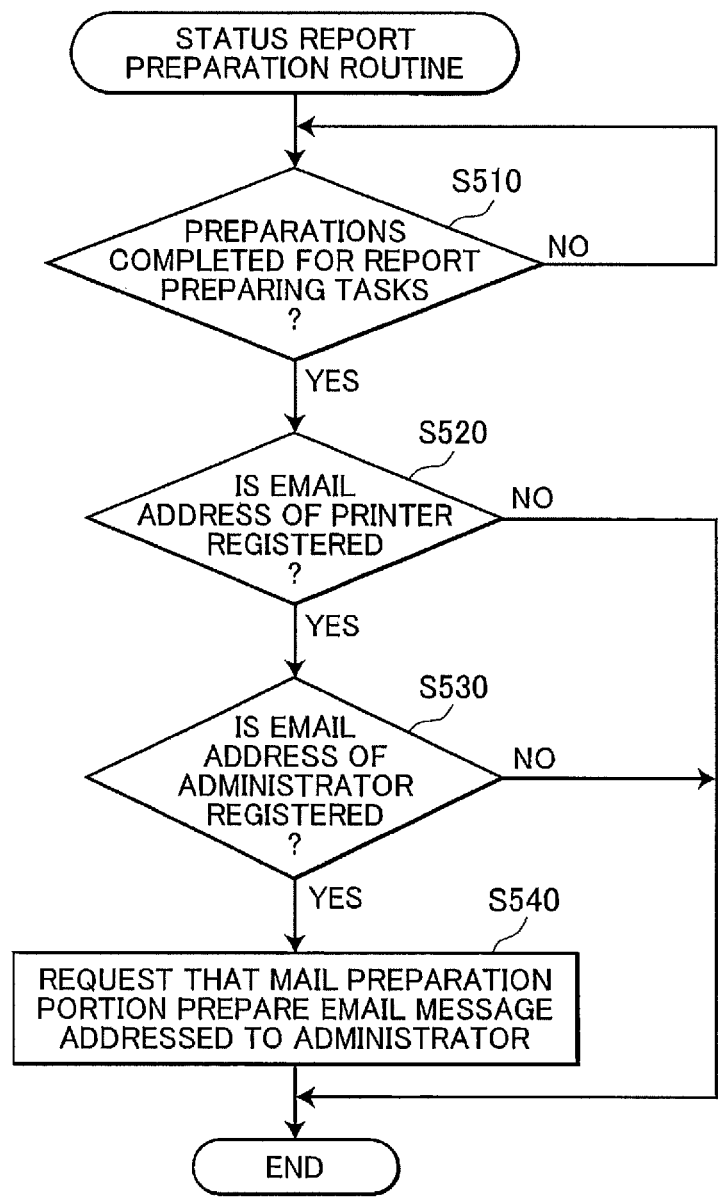
FIG. 11 is a flowchart representing a status report preparation routine of FIG. 3.

FIG. 11 is a flowchart representing flow of processes that correspond to the status report preparation routine in S16 of FIG. 3, which are performed in the control integration portion 231 at a preset timing.

When it is detected that the time has arrived to send out a status report and the status report preparation routine shown in FIG. 11 is started, then in S510 it is judged whether preparations are completed for tasks to prepare the status report.

If so (S510: YES), then in S520 the control integration portion 231 confirms whether the email address of the printer 2 is registered in the mail settings memory 223.

If so (S520: YES), then in S530 the control integration portion 231 it is confirmed whether the email address of the administrator that uses the administrator terminal 3 is registered in the mail settings memory 223. If so (S530: YES), then in S540 the mail preparation portion 222 is requested to prepare a notification mail addressed to the administrator. When settings are registered for notifying status reports to a plurality of different administrator terminals, then the status report preparation routine of FIG. 11 is executed separately based on settings for each administrator terminal. At this time, if the email addresses of more than one administrator are registered at the same notification timing, then requests are made to prepare notification mail for each administrator one after the other.

When the email address of either the printer 2 or the administrator is not registered in the mail settings memory 223 (S520 or S530: NO), then the control integration portion 231 ends the status report preparation routine without requesting that an email message be prepared addressed to the administrator.

The printer 2 and the administrator are registered using the administrator registration screen provided by the web server 234 to the administrator terminal 3.

Figures 13, 14:
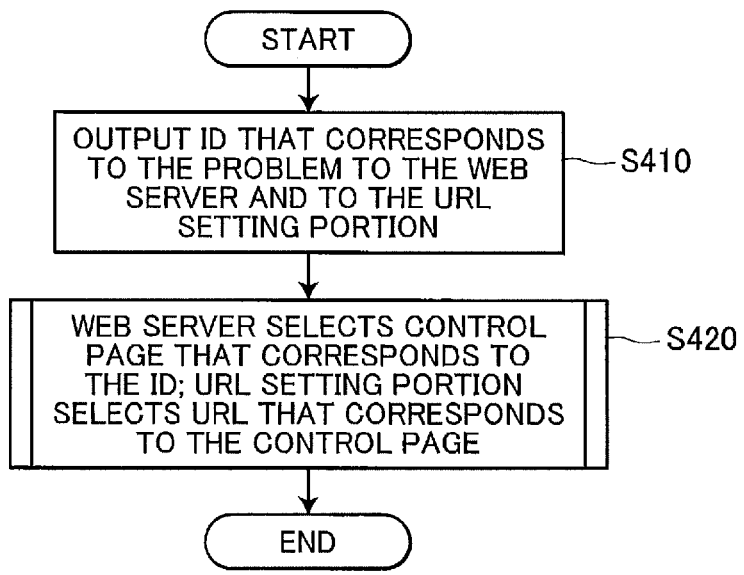
FIG. 13 is a schematic view showing an administrator registration screen for registering email address of the administrator.
FIG. 14 is a flowchart representing flow of processes performed in the control integration portion when a control page is generated.

FIG. 13 is a schematic view showing an administrator registration screen for registering email address and the like of the administrator in the mail settings memory 223 so that the status report about the printer 2 can be periodically transmitted to the administrator. As shown in FIG. 13, an administrator registration screen 70 includes an administrator address registration portion 71, a notification timing setting portion 72, and a setting confirmation portion 73. The administrator address registration portion 71 is for registering the email address for each administrator. The notification timing setting portion 72 is for setting timing at which the status report is to be sent to the administrator. The notification timing setting portion 72 enables setting a notification timing of daily, weekly, or monthly. For this reason, if the more than one administrator terminal 3 is connected to the network 1, then a notification timing can be set separately for each administrator terminal 3. The setting confirmation portion 73 is for the administrator to confirm that settings, such as the administrator's email address, are correct.

The embodiment describes that settings, such as whether the URL of the control page should be appended to email messages addressed to the administrator and whether only an administrator having a particular domain name, are set according to settings of the administrator registration screen 33 shown in FIG. 6. However, the administrator registration screen 70 can be set up separately for these settings.

It should be noted that the administrator registration screen 70 is supported by a graphic user interface. The administrator address registration portion 71 can be set by merely inputting the email address. Also, selections and settings about necessity can be set in the notification timing setting portion 72 by merely clicking in the circular frame to the left of the corresponding category or inputting the desired time. The setting confirmation portion 73 can be operated by merely clicking on the button that corresponds to the desired confirmation operation.

When the email address of the administrator is registered and settings are entered in the administrator registration screen 70 and the settings confirmed, then the information from each setting category is transmitted to the control integration portion 231 through the network 1 and the network control portion 221. After performed processes, the control integration portion 231 stores information in the mail settings memory 223.

The processes performed in the control integration portion 231 when preparing the email message addressed to the administrator are substantially the same as those represented in the flowchart of FIG. 7, but differ in that a request is made for preparation of a main page of the web server 234 instead of the control page.

FIG. 12 is a schematic view showing an email message addressed to the administrator transmitted as a status report to the administrator. As shown in FIG. 12, an email message 60 addressed to the administrator includes header information 62, date information 63, node information 64, a URL display portion 61, a status information 65, and consumables information 66. The header information 62 shows the time and date that the email message was transmitted. The node information 64 includes information such as the name, device type, and location of the printer 2. The URL display portion 61 shows the URL for linking to the main page. The status information 65 indicates use conditions of the printer 2. The status information 65 indicates use conditions of consumable items such as toner. In the present example, the status information 65 is toner information.

The information listed on the email message 60 addressed to the administrator can be in a predetermined format or can be selected by the administrator. When each administrator desires to be notified about different information, then the email message 60 can be modified to enable different settings for each administrator. In this case, information such as that selected by other administrators, such as the administrator 2, can be added to the email message 60.

The email message 30 addressed to the administrator enables the administrator to periodically grasp the use condition of consumables and the status of the printer 2 and to access the main pages by merely clicking on the URL display portion 8.

When it is set that the URL should not be displayed and the domain name of the administrator does not match the permission domain name, then the email message addressed to the administrator is transmitted to the administrator without appending the URL of the main page.

Next, a printer 2 according to a second embodiment of the present invention will be explained.

The printer 2 of the second embodiment differs from the printer 2 of the first embodiment only in a portion of the functions in the control portion 23 and in the method for generating the control page. Accordingly, explanation will be omitted for portions that are the same as in the first embodiment, and explanation for the second embodiment will focus on dissimilar areas.

According to the second embodiment, the control integration portion 231 stores an ID appended to each type of problem that can occur in the printer 2. When a problem occurs in the printer 2, then the type of problem is determined and the corresponding ID is outputted to the web server 234 and the URL settings portion 235.

The web server 234 prestores a control page for each type of problem in one-to-one correspondence with each ID. When an ID is input from the control integration portion 231, then the web server 234 selects the corresponding control page from the plurality of control pages.

The URL settings portion 235 prestores, in one-to-one correspondence with the different problem types, URLs that correspond to each of the control pages stored in the web server 234. When an ID is input from the control integration portion 231, then the URL settings portion 235 supplies the corresponding URL to the mail preparation portion 222.

FIG. 14 is a flowchart representing flow of processes performed in the control integration portion 231 when a control page is generated. When the control page generation routine shown in FIG. 14 is started, then the control integration portion 231 outputs in S410 outputs the ID that corresponds to the problem that occurred in the printer 2 to the web server 234 and the URL settings portion 235. Then, in S420 the web server 234 selects the control page that corresponds to the problem and the URL settings portion 235 selects the URL that corresponds to the control page. The web server 234 waits for the administrator to access the selected control page. The mail preparation portion 222 appends the selected URL to an email message addressed to the administrator and transmits the email message to the email address of the administrator along with information about the problem.

When the administrator receives the email message addressed to the administrator and clicks on the URL appended to the email message addressed to the administrator, then web server 234 provides the selected control page to the administrator terminal 3.

In the same manner as in the first embodiment, according to the second embodiment, when a problem occurs in the printer 2 operations for resolving the problem can be quickly undertaken. Also, a network terminal with simple operations for solving the problem can be realized. The printer 2 of the second embodiment prestores control pages. When a problem occurs. The printer 2 selects the corresponding control page and provides it to the administrator terminal 3. Therefore, processes for preparing the control page are simpler than in the first embodiment, where a control page is generated each time a problem occurs.

While the invention has been described in detail with reference to specific embodiments thereof, it would be apparent to those skilled in the art that various changes and modifications may be made therein without departing from the spirit of the invention, the scope of which is defined by the attached claims.

For example, the embodiments describe the present invention applied to a printer. However the present invention can be applied to a facsimile machine, a label printer, or a multifunction peripheral, which includes two or more of a printer function, a facsimile function, and a scanner function.

The information notified from the network terminal to an administrator is not limited to problem information, but could any kind of information than can be notified using an email messages, such as information indicating an empty or near empty condition of consumables such as ink, toner, or recording sheets of the printer 2. When the information relates to consumables, then the information could further include model name of the consumable and contact information on where to order the consumable.

Also, if the network terminal includes a printer function, then the printer function can be used to printer out the notification mail when the notification mail is transmitted to the administrator terminal.

Further, the network 1 need not be a wire LAN, but could be a wireless LAN or wireless technology such as BlueTooth can be used instead.

What is claimed is:

1. A network device comprising:
a printing mechanism for printing;
a web server including registration screen data representing a registration screen for registering data;
a processor; and
a memory storing computer-readable instructions therein, wherein the computer-readable instructions, when executed by the processor, causing the network device to perform:
providing the registration screen data to a first terminal;
registering, by being operated on the registration screen at the first terminal, a plurality of email addresses and a plurality of conditions associated with the printing mechanism to be notified by email in the memory, the plurality of the conditions including at least two conditions of a paper size error, a lack of a consumable, an empty of the consumable, a near empty of the consumable, a cover open, a consumable error, a printer error, and a job error;

detecting a first condition of the at least two conditions in the network device;

transmitting a first email to a first mail address associated with the first condition in a case where the first condition is detected, the first email address being included in the plurality of email addresses, the first email having a first body including a first URL for accessing the network device, the first email being received by a second terminal;

providing a first web page to the second terminal in a case where the network device is accessed by the second terminal;

detecting a second condition of the at least two conditions in the network device, the second condition being different from the first condition;

transmitting a second email to a second mail address associated with the second condition in a case where the second condition is detected, the second mail address being included in the plurality of email addresses and being different from the first mail address, the second email having a second body including a second URL for accessing the network device, the second email being received by a third terminal; and providing a second web page to the third terminal in a case where the network device is accessed by the third terminal.

2. The network device according to claim 1, wherein the at least two conditions include a third condition, the third condition being different from both the first condition and the second condition, wherein the computer-readable instructions cause the network device to further perform:

detecting the third condition in the network device;

transmitting the first email to the first mail address associated with the third condition and the second email to the second mail address associated with the third condition in a case where the third condition is detected, each of the first email and the second email having a third body including a third URL for accessing the network device; and providing a third web page to one of the first terminal and the second terminal in a case where the network device is accessed by the one of the first terminal and the second terminal.

3. The network device according to claim 1, wherein the first body of the first email includes information related to the first condition and the second body of the second email includes information related to the second condition.

4. The network device according to claim 1, wherein the first body of the first email includes device identifying information and the second body of the second email includes the device identifying information, the device identifying information being for identifying the network device.

5. The network device according to claim 1, wherein the first URL is used for displaying the first web page related to the network device on a display of the second terminal, and the second URL is used for displaying the second web page related to the network device on a display of the third terminal.

6. The network device according to claim 1, wherein the first URL is used for displaying the first web page showing a current condition of the network device on a display of the second terminal, and the second URL is used for displaying the second web page showing a current condition of the network device on a display of the third terminal.

7. The network device according to claim 1, wherein the first URL is used for displaying the first web page related to the first condition on a display of the second terminal, and the second URL is used for displaying the second web page related to the second condition on a display of the third terminal.

8. The network device according to claim 1, wherein the first URL comprises characters including an IP address of the network device, and the second URL comprises characters including the IP address.

9. The network device according to claim 1, wherein the computer-readable instructions cause the network device to further perform:

generating the first email in a case where the first condition is detected and the second email in a case where the second condition is detected.

10. The network device according to claim 1, wherein the first URL is identical to the second URL.

11. The network device according to claim 1, wherein the first URL is different from the second URL, and the first web page is different from the second web page.

12. A non-transitory computer-readable medium storing computer-readable instructions for a network device, when executed by a processor of the network device, causing the network device to perform:

providing registration screen data representing a registration screen to a first terminal;

registering, by being operated on the registration screen at the first terminal, a plurality of email addresses and a plurality of conditions associated with a printing mechanism to be notified by email in a memory, the plurality of the conditions including at least two conditions of a paper size error, a lack of a consumable, an empty of the consumable, a near empty of the consumable, a cover open, a consumable error, a printer error, and job error;

detecting a first condition of the at least two conditions in the network device;

transmitting a first email to the first mail address associated with the first condition in a case where the first condition is detected, the first email address being included in the plurality of email addresses, the first email having a first body including a first URL for accessing the network device, the first email being received by a second terminal;

providing a first web page to the second terminal in a case where the network device is accessed by the second terminal;

detecting a second condition of the at least two conditions in the network device, the second condition being different from the first condition;

transmitting a second email to a second mail address associated with the second condition in a case where the second condition is detected, the second mail address being included in the plurality of email addresses and being different from the first mail address, the second email having a second body including a second URL for accessing the network device, the second email being received by a third terminal; and providing a second web page to the third terminal in a case where the network device is accessed by the third terminal.

* * * * *